Figure 1:
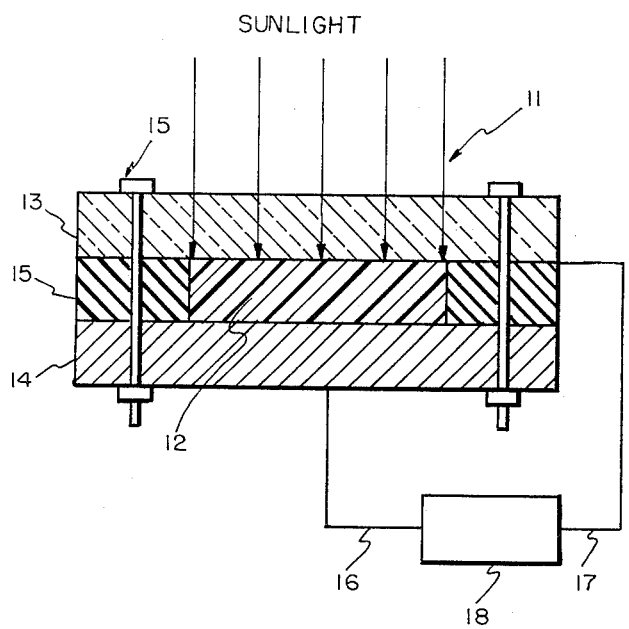

3,046,323
PHOTOELECTRIC DEVICE
Bernard S. Wildi, Dayton, Ohio, assignor to Monsanto Chemical Company, St. Louis, Mo., a corporation of Delaware
Filed Mar. 7, 1960, Ser. No. 13,357
3 Claims. (Cl. 136—89)

The invention relates to a photoelectric device especially to a photovoltaic device. More particularly the invention involves photosensitive pyrolyzed pyromellitonitrile/hydrogen sulfide reaction product bodies and the use thereof in photoelectric, including solar devices. These bodies or elements can suitably be in the form of discs, wafers, bars, rods, rectangular parallelepipeds, round or most any geometric shape; however, thin discs, wafers, or rectangular parallelepipeds are preferred.

It is well known in the art to employ inorganic material as photosensitive components; however, few suitable organic materials have previously been known. It has now been discovered that a certain new type of organic material is useful for this purpose. These materials which are pyrolyzed pyromellitonitrile/hydrogen sulfide reaction products are described in detail in copending application Serial No. 13,355, filed concurrently herewith. The reaction product contains substantially 2 moles of hydrogen sulfide per mole of pyromellitonitrile. The pyrolyzed product is produced by heating the reaction product either in powdered or pelleted form under high vacuum or in the presence of an inert atmosphere at a temperature in the range of about 180–700° C., preferably 300–600° C. The time of heating varies with the temperature and the properties of the product desired and may vary from an hour or less to a number of days.

It is an object of this invention to provide a new photoelectric device useful to operate or actuate almost any type of equipment to be controlled by light.

It is another object of this invention to provide a new solar cell for generating direct current power useful in charging storage batteries or for other direct current electrical power uses.

It is another object of this invention to provide a new photosensitive body especially useful in photoelectric and solar devices for generating direct current power.

These and other objects of the invention will become apparent as the detailed description of the invention proceeds.

In making the photosensitive bodies of the invention pyromellitonitrile, a new compound described in copending application Serial No. 696,026, filed November 13, 1957, now abandoned, is used. The invention will be more clearly understood from the following detailed description of specific examples thereof read in conjunction with the accompanying drawing wherein:

FIGURE 1 is an elevational view partly in section of an embodiment of the invention.

Example 1

This example describes the preparation of pyromellitonitrile/hydrogen sulfide reaction product prepared in the presence of the base ammonium hydroxide. A sample of 20 g. of pyromellitonitrile, 400 ml. of ethanol and 40 ml. of concentrated ammonium hydroxide were placed in a three-necked 1 liter flask equipped with a stirrer, thermometer, condenser and a gas inlet tube. Then hydrogen sulfide was passed through the mixture in the flask. The contents of the flask turned dark red immediately and all of the material went into solution. The temperature of the reaction mixture went to 35° C. and was maintained at about this temperature by the controlled addition of hydrogen sulfide. After 3½ hours of hydrogen sulfide addition, the addition of hydrogen sulfide was terminated and the reaction mixture was gradually heated to reflux and maintained at reflux temperatures for 1½ hours. Then the reaction mixture was filtered to recover a solid material which was washed with 2 liters of methanol. The dried residue product from the methanol washing was put in a vacuum sublimator for four days at 200° C./0.2 mm. of Hg absolute pressure. An elemental analysis of the residue product from the vacuum sublimation treatment yielded the following results:

| Percent: | Found |
|---|---|
| C | 55.4 |
| H | 2.7 |
| S | 14.0 |

From the residual product of this example a pellet was prepared having ½″ diameter by hot pressing the powdered residual material at about 325° C. for 15 minutes using about 20,000 pounds force. The pellet had a thickness of between about 1 and 3 mm. Resistivity measurements and thermoelectric power measurements were made on the pellet in a manner similar to that described in Example 6 of application Serial No. 13,355, filed concurrently herewith. The resistivity $\rho$ was 3700 ohm-cm. and the thermoelectric power (TEP) was −18 microvolts per degree C. Resistivity measurements were made with the sample in a vacuum of about $10^{-3}$ mm. of Hg absolute pressure at room temperature.

Example 2

This example describes the photovoltaic testing of the heat treated pellet or wafer of Example 1. The pellet for testing was mounted and clamped in sandwich fashion between a brass plate and a glass plate having a conducting surface. The conducting surface of the glass plate was in contact with one side of the sample. Sufficient pressure was used in clamping the sandwich to make good ohmic contact between the pellet of pyrolyzed hydrogen sulfide/pyromellitonitrile reaction product and the glass plate and brass plate. Electrical leads were connected to the conducting surface of the glass plate and to the brass plate. A microvoltmeter was used to measure generated voltage. The light source for irradiation of the sample through the glass plate was a microscope lamp of 16 watts having a condensing and focusing system of lenses. In irradiating the sample with this lamp the light source was moved to as close as about 4″ and as far away as about 18″ for the extremes of the readings of voltage generated in the pellet. At these extremes of light source distance the voltage generated in the pellet as registered on the microvoltmeter was 60–120 microvolts. As is obvious from the description of the experiment above, strictly speaking, this experiment provided a semi-quantative measure of the photovoltaic properties of the pellets.

Pyrolyzed pyromellitonitrile/hydrogen sulfide reaction products made without catalyst or in the presence of other base catalysts such as sodium hydroxide or pyridine also exhibit photovoltaic properties.

In FIGURE 1 is shown a photoelectric device or cell 11. The active material in this device is photosensitive body 12 which is in the form of a disc or wafer of pyrolyzed hydrogen sulfide/pyromellitonitrile reaction product. Frame 13 made of glass or other light transparent substance having a conducting surface on the underside thereof forms the upper portion of device 11. Glass having a transparent conducting surface thereon is well known in the art being commercially available, e.g. "NESA" glass and can be made for example as described in U.S. 2,583,000. The glass having low resistance conducting films are preferred. Frame 14 suitably a brass or other metal plate forms the bottom portion of device 11. The sides of device 11 are formed by gasket 15 suitably made of rubber or other electrical insulating material. Nuts and bolts 15 regularly spaced near the outer edge of the device serve to hold the cell together. Preferably wafer 12 has a conducting film on the bottom surface thereof to promote a good ohmic contact with the metal plate or frame 14. The conducting surface on the underside of wafer 12 is suitably a silver surface applied by evaporating silver on to the disc or by the use of silver paint. Nuts and bolts 15 are insulated by insulating washers and sleeves to prevent short circuiting the conducting film of frame 13 to frame 14. Electrical leads 16 and 17 are connected to frame 14 and the conducting surface of frame 13 by conventional mechanical means or by soldering. Leads 16 and 17 connect load 18 to device 11. Load 18 to be operated by device 11 is suitably an electrical load such as a storage battery to be charged, a transistor receiver, a microswitch, etc. Sunlight falling on disc 12 as shown in FIGURE 1 generates a D.C. voltage in wafer 12 for operating load 18. For optimum efficiency in a photocell and particularly in a solar cell for transforming sunlight into electrical energy, photosensitive body 12 should have a total thickness of not more than about 40 mils. In essence structurally, as thin a photosensitive disc as can be made and satisfactorily used in the device should be used. If the photoconductive body were appreciably thicker than about 40 mils, e.g. greater than about 100 mils, the efficiency of the device would be substantially reduced, since the electricity generated in the device by the light or sunlight would be at least partially dissipated before reaching the conducting surfaces of the device.

Although the invention has been described in terms of specified apparatus which is set forth in considerable detail, it should be understood that this is by way of illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed is:

1. A photoelectric device comprising a photosensitive element having a transparent conducting surface in ohmic contact with one side of said element and a conducting surface in ohmic contact with the other side of said element, said element having been made by the process comprising: (1) mixing pyromellitonitrile and hydrogen sulfide to form a reaction product having substantially 2 moles of hydrogen sulfide per mole of pyromellitonitrile, (2) separating said reaction product from the reaction mixture, (3) forming an element under pressure from said separated reaction product, and (4) heating said formed element at a temperature in the range of about 180°–700° C. for a time sufficient to produce the desired thermoelectric element.

2. The device of claim 1 wherein the mixing of the pyromellitonitrile and hydrogen sulfide was carried out, and in the presence of ammonium hydroxide, and the heating of said formed element was carried out in an inert atmosphere.

3. The device of claim 1 wherein said element is not more than about 40 mils thick.

References Cited in the file of this patent

Eley: Organic Semiconductors, Research (London), vol. 12, 1959, pages 293–299.